United States Patent
Betts et al.

(10) Patent No.: US 7,436,828 B2
(45) Date of Patent: Oct. 14, 2008

(54) METHOD AND APPARATUS FOR LABEL SWITCHING DATA PACKETS

(75) Inventors: Malcolm Betts, Kanata (CA); David Allan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 911 days.

(21) Appl. No.: 10/658,384

(22) Filed: Sep. 10, 2003

(65) Prior Publication Data

US 2005/0053071 A1    Mar. 10, 2005

(51) Int. Cl.
H04L 12/28    (2006.01)

(52) U.S. Cl. .......................... 370/389; 370/400

(58) Field of Classification Search .............. None
See application file for complete search history.

(56) References Cited

U.S. PATENT DOCUMENTS

| | | | | |
|---|---|---|---|---|
| 6,751,190 B1 * | 6/2004 | Swallow | ............... | 370/217 |
| 6,965,572 B1 * | 11/2005 | Boodaghians | ............... | 370/249 |
| 7,046,669 B1 * | 5/2006 | Mauger et al. | ............... | 370/393 |
| 7,139,272 B1 * | 11/2006 | Aggarwal et al. | ............ | 370/392 |
| 7,158,524 B2 * | 1/2007 | Buyukkoc et al. | ........ | 370/395.1 |
| 2003/0081589 A1 | 5/2003 | Marian et al. | | |

FOREIGN PATENT DOCUMENTS

| | | |
|---|---|---|
| CA | 2300343 | 9/2000 |
| CA | 2441271 | 10/2002 |

OTHER PUBLICATIONS

E. Rosen et al., "MPLS Label Stack Encoding", (RFC3032), Jan. 2001, http://www.faqs.org/rfcs/rfc3032.html.

* cited by examiner

*Primary Examiner*—Edan Orgad
*Assistant Examiner*—Jung Park
(74) *Attorney, Agent, or Firm*—Jeffrey M. Measures; Borden Ladners Gervais LLP

(57) ABSTRACT

A data packet for transmission in a data network having one or more layers. The data packet has a label stack with one or more labels on the basis of which the data packet can be switched in the data network, where each label has a switching significance in one or more of the layers of the data network. The data packet also has at least one layer identifier associated with a label in the label stack.

31 Claims, 3 Drawing Sheets

METHOD AND APPARATUS FOR LABEL SWITCHING DATA PACKETS

FIELD OF THE INVENTION

The invention relates to the transport of data packets in a data network, more specifically to a method and an apparatus for label switching data packets. The invention also provides a novel data packet containing information allowing to ascertain if one or more labels in the data packet have switching significance in a certain layer of the data network.

BACKGROUND OF THE INVENTION

Multiprotocol Label Switching (MPLS) is a forwarding protocol, which uses labels to increase the speed and efficiency with which a data network transports data packets. In contrast to a traditional IP address, the MPLS protocol uses a limited set of labels on the basis of which switching decisions are made into an MPLS domain. Each data packet contains a label stack that can hold one or more labels.

When a data packet enters an MPLS domain via a Label Edge Router (LER), the LER determines if the data packet should be accepted and in the affirmative pushes one or more labels in the label stack. The labels determine the path or part of the path the data packet should follow in the MPLS domain. Next, the data packet leaves the LER and reaches a Label Switching Router (LSR) that examines the label at the topmost position in the label stack and determines how the data packet should be switched. The LSR can perform label stack manipulations, such as swapping or pushing other labels in the label stack that will determine where the data packet will go next. When the data packet reaches the end of the MPLS domain, it can egress the domain via another LER, which pops all the labels in the stack thus restoring the data packet to its condition prior to entering the MPLS domain.

Since different parts of a large data network are usually managed by different entities, such as different carriers, there is generally no network-wide label convention among the carriers. Accordingly, the same label can have a different switching significance in different locations of the network. The use of a stack for temporarily storing labels in the data packet ensures that only the correct label is presented for processing at the location where it has a proper switching significance. This however holds true only if all the stack manipulations occurring along the path of the data packet are flawless. If for some reason an error is made and a label is incorrectly pushed in the stack or popped from the stack, the remaining labels will be incorrectly interpreted at downstream LSRs with the result that the data packet will follow an erroneous path. A similar problem may occur if a connection error exists between two LSRs in the data network. The connection error will cause data packets to be incorrectly received by an LSR that however, will not be able to recognize the problem and will simply incorrectly forward the data packets at other nodes.

Another drawback associated with currently implemented MPLS protocols is their inability to provide a clear demarcation between the network and its users. Accordingly, it is difficult for the data network to enforce admission control, hence compliance with a Service Level Agreement (SLA) or guarantee network performance such as Quality of Service (QoS) arrangements.

Accordingly, there exists a need in the industry to provide a novel mechanism for data packet transmission in a data network, based on label switching that avoids at least some of the problems associated with prior art methods.

SUMMARY OF THE INVENTION

In a first broad aspect, the invention provides a data packet for transmission in a data network having one or more layers. The data packet has a label stack with one or more labels on the basis of which the data packet can be switched in the data network, where each label has a switching significance in one or more of the layers of the data network. The data packet also has at least one layer identifier associated with a label in the label stack.

Advantageously, this data packet structure allows network entities in the data network that receive the data packet to determine where the labels in the data packet have switching significance. Accordingly, misdirected data packets can be identified at an early stage and prevented from further propagating along an erroneous path. In addition, the layer identifiers permit a clearer demarcation between the network and its users, allowing network operators to better enforce compliance with SLAs or to meet QoS agreements.

In a second broad aspect, the invention provides a network entity for use in a data network for label switching data packets, the data network having one or more layers. The network entity has one or more input ports for receiving data packets to be label switched and one or more output ports for releasing data packets from the network entity. The network entity also has a switching controller for switching a data packet received at one of the input ports to one of said output ports on a basis of a label contained in the data packet, the switching controller operative to ascertain if the label contained in the data packet has a switching significance in the layer of the data network to which the network entity belongs.

In a third broad aspect the invention provides a method for label switching data packets. The method comprises receiving a data packet containing at least one label. The method further includes ascertaining if the label has a switching significance in an area of interest in the data network and in the affirmative, switching the data packet on the basis of the label.

BRIEF DESCRIPTION OF THE DRAWINGS

A detailed description of examples of implementation of the present invention is provided hereinbelow with reference to the following drawings, in which.

Figure 1:
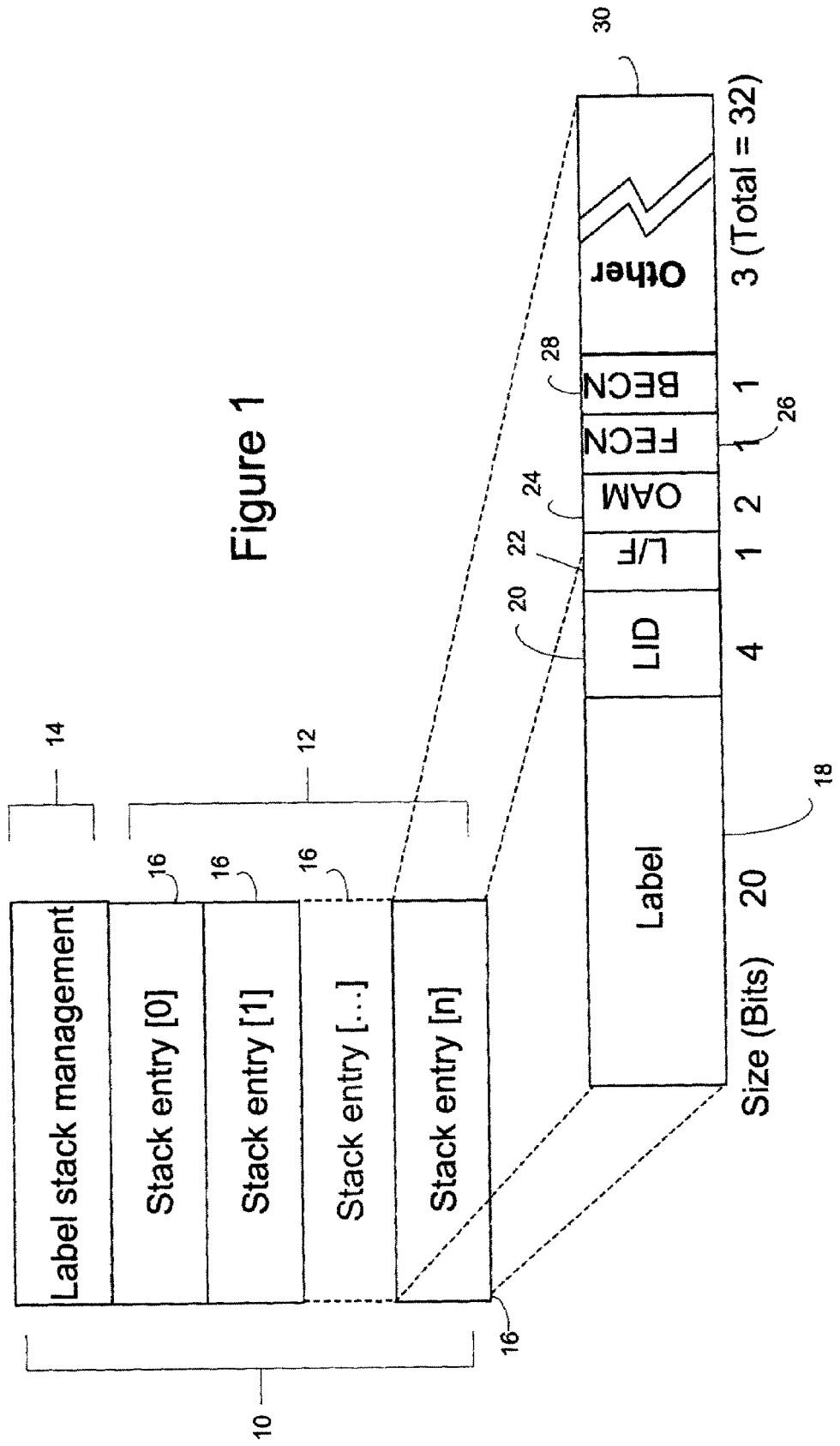
FIG. 1 is a diagram illustrating the structure of a data packet in accordance with a non-limiting example of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 illustrates an example of implementation of a data packet in accordance with the present invention. This data packet structure can be used to encapsulate packetized traffic for transport over a label-switched transport network. In a specific example, the data packet can be generated by using the General Framing Procedure (GFP), described in the ITU-T recommendation G.7041, which defines a generic framing procedure to delineate variable length payloads to higher-level signal clients for subsequent transport into payload envelopes.

It should be expressly noted that the use of the GFP packet delineation scheme is only an example of implementation of the invention and other schemes to obtain the data packet can be used without departing from the spirit of the invention.

The data packet of FIG. 1 is label switched and comprises an overhead component having a label container 10 that includes two sections namely, a label stack 12 and a label stack management field 14. The label stack management field 14 is a 4-byte field that includes information relative to the label container 10 and other information of a more general nature relative to the data packet. For example, the label stack management field 14 includes the size of the label stack 12, the Class of Service (CoS) associated with the data packet, the data packet loss priority (discard eligibility), the label container error check, among other possible types of information.

The label stack 12 includes one or more entries 16. Each entry 16 is 32-bit wide and has a 20-bit label field 18 that contains a label. The entry 16 further includes a 4-bit field 20 holding a layer identifier (LID) associated with the label in the label field 18. The layer identifier indicates in which network layer the label has a switching significance. The notion of layer in a data network and the notion of switching significance will be discussed later.

The entry 16 further includes a field 22, holding a local or foreign (L/F) key capable to acquire different values. The key is an additional hierarchical level, above the layer identifier, permitting to distinguish between network layers having identical layer identifiers. In a specific example of implementation, the L/F key is a one-bit flag that can take two values. The entry 16 also includes a 2-bit Operations and Maintenance (OAM) field 24 for holding an OAM alert indication, a 1-bit Forward Congestion Notification (FECN) field 26, a 1-bit Backward Congestion Notification (BECN) field 28, and an additional 3-bit field 30 for supplementary information, if required by the intended application.

As it will be described later, the size of the label stack 12 will vary from one data packet to another, as a result of entries 16 being pushed into the label stack 12 and entries 16 being popped from the label stack 12.

In addition to the label container 10 described above, the data packet also has a payload in which is placed the data being transported. The payload is not shown in FIG. 1. In a specific example of implementation, the payload may be an Internet Protocol (IP) packet that includes an address designating the destination of the packet. If desired, the data packet can include other overhead components such as error detection and/or error correction fields, among others.

Figure 2:
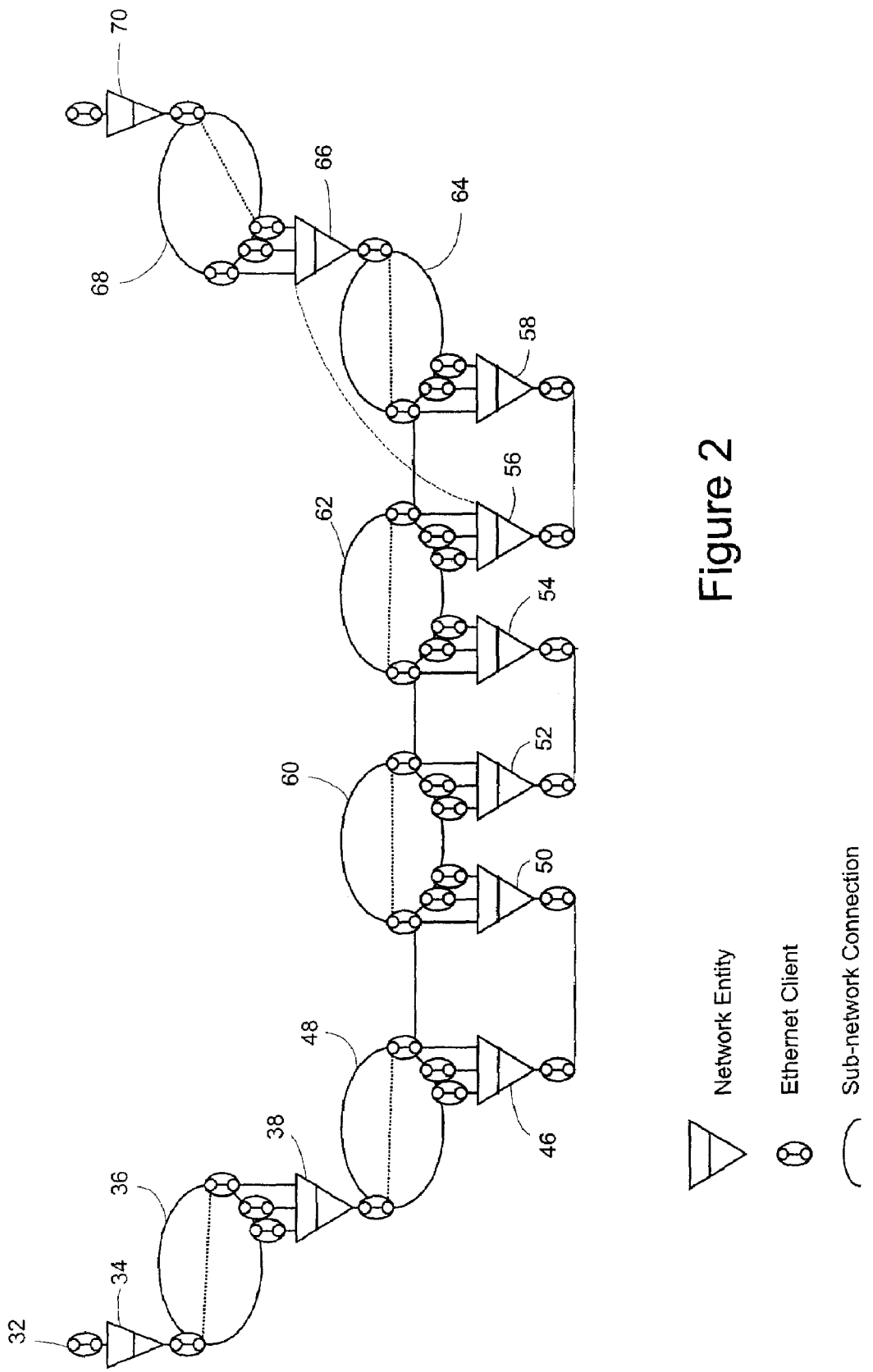
FIG. 2 is a schematical diagram of a label-switched network domain in which the data packet shown at FIG. 1 can be transported.

FIG. 2 is a schematical diagram of a data network in which the data packet described earlier can be used. An Ethernet client 32 is connected to the edge of the data network. The data flow is received by the network entity 34, which may be a router, and which encapsulates the packets from the client 32, by using the GFP scheme into data packets shown in FIG. 1. Those data packets are delivered via a sub-network connection 36 to a network entity 38, such as an LSR that will multiplex those data packets with additional traffic. At this point, the network entity 38 will push an entry 16 in the label stack 12. The entry 16 includes a label and a layer identifier. The purpose of the layer identifier is to convey in which layer of the data network the label has switching significance. A label is considered to have a switching significance when the switching behavior produced on the basis of the label will be predictable and as intended.

The notion of a layer in a data network is generally known and does not need to be described in detail. Suffice it to say that a layer encompasses one or more network entities that share a common control plane, which can be implemented as a distributed entity or a centralized one. A layer may encompass a single network entity or a plurality of entities. In the case of a plurality of entities, those entities can be contiguous, in other words directly connected to one another via links. Alternatively, the network entities may not be directly connected to one another. Instead they may be connected via entities or links that belong to a different layer.

Layers in a data network are normally attributed in an arbitrary manner that may take into account topological considerations and owner/operator considerations.

Figure 3:
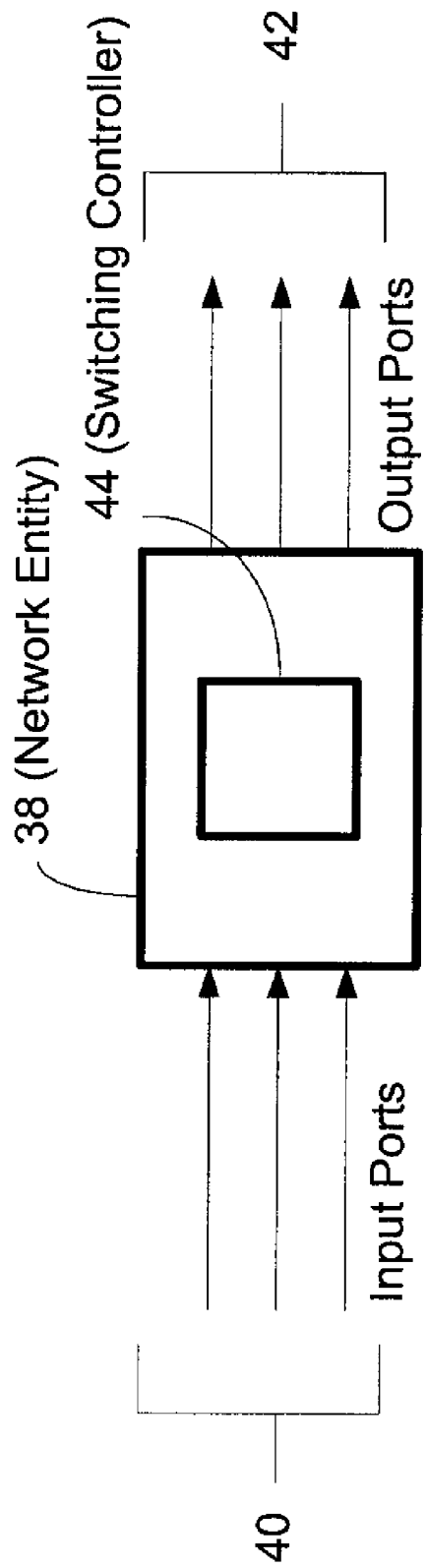
FIG. 3 is a block diagram of a network entity used in the network shown at FIG. 2.

A general block diagram of the network entity 38 is shown at FIG. 3. The network entity 38 is in the form of a router, comprising a plurality of input ports 40 at which data packets are received and a plurality of output ports 42 from which data packets are forwarded to respective destinations. The network entity 38 also includes a switching controller 44 that switches the data packets received at the input ports 40 to their respective output ports 42. The switching controller 44 performs switching operations on the basis of the labels contained in the label stacks 12 of the data packets. Specifically, when a data packet is received at an input port 40, it is loaded in the computer readable storage medium of the switching controller 44. The entry 16 in the topmost position in the label stack 12 is read. The switching controller 44 will extract the layer identifier and compare it to the layer identifier to which the network entity 38 belongs. If there is a match, the switching controller 44 concludes that the label in the topmost entry 16 in the label stack 12 has a switching significance in the network layer to which the network entity 38 belongs, and the switching controller 44 will switch the data packet on the basis of the label. However, if there is no match, the switching controller 44 will declare an error condition and will not label switch the data packet. The error condition may cause the network entity 38 to generate one or more error notifications to other entities in the network, such that they are made aware of the problem. Other ways of handling the error condition can be envisaged without departing from the spirit of the invention.

The switching controller 44 can also perform manipulations of the label stack 12 such as pushing additional labels and associated layer identifiers (i.e. multiplexing the stream onto a server layer), or popping labels and associated layer identifiers (i.e. demultiplexing from a server layer), among others.

The switching controller 44 can be implemented in software, hardware or a combination of both.

Referring back to the network diagram of FIG. 2 and continuing with the previous example, the data network has two layers, the first layer including network entities 38 and 66, and a second layer including network entities 46, 50, 52, 54, 56 and 58. When the data packet is released from the network entity 38 it is forwarded to the network entity 46 via sub network connection 48. The data packet travels toward the network entity 46 embedded into a signal transmitted over a suitable link, which can be wireline or wireless link. At network entity 46 a second label and the associated layer identifier are pushed into the label stack 12. The data packet is forwarded through the second layer successively via the network entities 50, 52, 54, 56 and 58 and the sub network connections 60, 62, and 64. At each network entity, before performing any label switching, the layer identifier is assessed and the network entity determines if the label has switching significance. In the affirmative, the switching operation is performed; otherwise an error condition is declared.

The data packet leaves the second layer and enters back the first layer when it is forwarded from the network entity 58 to the network entity 66 via the sub network connection 64. The same layer verification is performed here, as the one described earlier. The topmost entry 16 in the label stack 12 is read and the layer identifier is extracted to determine if the label has a switching significance in the second layer of the data network. In the affirmative, the label switching operation is performed, otherwise an error condition is declared. For instance, assume that as a result of an error, the data packet is switched from the network entity 56 directly to the network entity 66 (along the dotted line connection), instead of being forwarded to the network entity 58. The network entity 66 checks the layer identifier in the topmost entry 16 in the label stack 12 and will declare an error condition, thus preventing further propagation of the data packet along an erroneous path.

Since no further label switching will be performed downstream the network entity 66, the latter will clear the label stack 12. The resulting data packet is sent to the edge network entity 68 where the data packet undergoes a de-encapsulation process to obtain the original data packet that was forwarded by the client 32.

In the above example, an assumption was made to the effect that a convention exists in the data network as to the layer identifiers. Specifically, the convention assigns a unique identifier to each layer such that there is no confusion. This scenario may be realistic for a portion of a data network managed by a single entity, such as a carrier. However, in large networks, where different parts may be under the control of different carriers, such convention may not exist, which may result into conflicts if the same layer identifier is assigned to more than one layer. To avoid this potential problem, the data packet provides in each entry 16 an L/F key that can be used to indicate that a certain layer identifier is foreign or local. By default, this key, which in this example is implemented as a one-bit flag, is set to local. However, when a first layer transits the network of a second administration using a second layer, the flag is set to foreign by the network entity at the boundary between the two administrations. In this fashion, should a traffic spill occur and a network entity is presented with a label having a "foreign" layer identifier, an error condition is declared.

To better illustrate this feature consider a situation where the network entity is located at a logical boundary between a first network operator and a second network operator. The second network operator can terminate a layer of the data network implemented or managed by the first network operator by overwriting the key in the data packet associated with the identifier of the first layer with a "local" value that corresponds to a key of a layer implemented or managed by the second network operator.

In another situation where the network entity is also located at the logical boundary between the first network operator and the second network operator, the network entity is capable of overwriting a key in a data packet associated with a layer identifier of a layer managed by the first network operator with a "foreign" value indicating that the layer identifier is not valid within a network layer implemented or managed by the second network operator. The foreign flag is set when the second network operator encapsulates the data from the first network operator, i.e., when a new label is pushed onto the label stack.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. In a network device, a method of transmitting a data packet in a data network having one or more layers, comprising:
   a) transmitting a label stack, said label stack including one or more labels on the basis of which the data packet can be switched in the data network, each label having a switching significance in one or more of the layers of the data network;
   b) transmitting at least one layer identifier associated with each label in said label stack;
   wherein said layer identifier allowing to determine in which layer of the data network the at least one label has a switching significance; and
   c) transmitting a key associated with each layer identifier, said key capable to acquire different values, said key permitting to distinguish between layers having identical layer identifiers.

2. A method as defined in claim 1, wherein said layer identifier allowing to distinguish between identical labels having switching significance in different layers of the data network.

3. A method as defined in claim 1, including a payload.

4. A method as defined in claim 1, wherein said key is a single bit flag.

5. A method as defined in claim 1, including transmitting an address of an entity in the data network at a layer of the data network to which the data packet is destined.

6. A method as defined in claim 5, wherein said label stack is of variable size allowing entities in the data network processing the data packet to push labels in said label stack and pop labels from said label stack.

7. A method as defined in claim 5, wherein the address is an IP address and wherein step (b) comprises transmitting a plurality of layer identifiers associated with a plurality of labels in said label stack.

8. A computer program product tangibly embodied in a computer readable storage medium storing software containing instructions, which when executed by a switching controller of a network entity, causes said network entity to create a data packet for transmission in a data network having one or more layers, said instructions, comprising:
   a) instructions for creating a label stack, said label stack including one or more labels on the basis of which the data packet can be switched in the data network, each label having a switching significance in one or more of the layers of the data network;
   b) instructions for creating a layer identifiers associated with each label in said label stack; said layer identifier allowing to determine in which layer of the data network the at least one label has a switching significance, said label stack includes a layer identifier associated with each label in said label stack; and
   c) instructions for including a key associated with each layer identifier, said key capable to acquire different values, said key permitting to distinguish between layers having identical layer identifiers.

9. A computer program product as defined in claim 8 wherein, said layer identifier allowing to distinguish between identical labels having switching significance in different layers of the data network.

10. A computer program product as defined in claim 8, wherein said key is a single bit flag.

11. A computer program product as defined in claim 8, wherein said label stack is of variable size allowing entities in the data network processing the data packet to push labels in said label stack and pop labels from said label stack.

12. A computer program product as defined in claim 8, including an address of an entity in the data network at a layer of the data network to which the data packet is destined.

13. A computer program product as defined in claim 12, wherein the address is an IP address and wherein said instructions for creating a layer identifier comprises instructions for creating a plurality of layer identifiers associated with a plurality of labels in said label stack.

14. A computer program product as defined in claim 8, including a payload.

15. A network entity for use in a data network for label switching data packets, the data network having one or more layers and said network entity being intended to be associated to at least one of the network layers, said network entity comprising:
  a) one or more input ports for receiving data packets to be label switched;
  b) one or more output ports for releasing data packets from said network entity;
  c) a switching controller for switching a given data packet received at one of said input ports to one of said output ports on a basis of a label contained in the given data packet, said switching controller operative to ascertain if the label contained in the given data packet has a switching significance in the layer of the data network to which the network entity is associated;
  wherein the given data packet has a label stack, the label contained in the given data packet being in the label stack; and
  wherein said switching controller ascertains if the label contained in the given data packet has a switching significance in a layer of the data network to which the network entity is associated on a basis of at least one of a plurality of layer identifiers contained in the label stack;
  wherein said switching controller completing the switching of the given data packet when said switching controller ascertains that the label contained in the given data packet has a switching significance in the layer of the data network to which the network entity is associated; and
  wherein the given data packet includes a key associated with the layer identifier, said switching controller capable to distinguish between data packets containing identical layer identifiers associated with respective labels at the same position in the respective label stacks of the data packets, on the basis of the keys associated with the layer identifiers.

16. A network entity as defined in claim 15, wherein said switching controller is capable to alter the key associated with a layer identifier in a data packet.

17. A network entity as defined in claim 16, wherein said network entity is located at a logical boundary between a first network operator and a second network operator, wherein the second network operator is capable of terminating a first layer of the data network implemented by the first network operator by overwriting a key in a data packet associated with the identifier of the first layer with a value of key corresponding to a layer implemented by of the second operator.

18. A network entity as defined in claim 16, wherein said network entity is located at a logical boundary between a first network operator and a second network operator, wherein said network entity is capable of overwriting a key in a data packet associated with an identifier of a first network layer managed by the first network operator with a value indicating that the layer identifier is not valid within a network layer managed by the second network operator.

19. A network entity as defined in claim 15, wherein said switching controller does not effect the switching of the given data packet when said switching controller ascertains that the label contained in the given data packet has no switching significance in the layer of the data network to which the network entity is associated.

20. A network entity as defined in claim 15, wherein the data packet contains a layer identifier associated with each label in the label stack.

21. A network entity as defined in claim 15, wherein said switching controller is capable to push a label in the label stack.

22. A network entity as defined in claim 21, wherein when pushing a certain label in the label stack said switching controller also inserting a layer identifier in the given data packet associated with the certain label.

23. A network entity as defined in claim 15, wherein said switching controller capable to pop a label from the label stack.

24. A network entity as defined in claim 23, wherein when popping a certain label from the label stack said switching controller also removes a layer identifier from the given data packet associated with the certain label.

25. A network entity as defined in claim 15, wherein said network entity is an LSR.

26. A method for label switching data packets in a data network having one or more layers, said method comprising:
  a) receiving a data packet at a location in the data network associated with at least one of the layers of the data network, the at least one layer being a first layer, the data packet containing at least one label;
  b) ascertaining if the label has a switching significance in the first layer;
  c) switching the data packet at said location on the basis of the label if said ascertaining indicates that the label has a switching significance in the first layer;
  wherein the data packet has a label stack comprising a plurality of labels, said switching being performed on a label in a topmost position in the label stack;
  wherein said ascertaining is performed on a basis of information contained in the data packet;
  wherein the information contained in the data packet is a layer identifier associated with the label in the topmost position in the label stack; and
  wherein the data packet includes a key associated with the layer identifier, the key allowing to distinguish between data packets containing identical layer identifiers associated with respective labels at the same position in the respective label stacks of the data packets, on the basis of the keys associated with the layer identifiers.

27. A method as defined in claim 26, comprising precluding label switching the data packet when said ascertaining indicates that the label has no switching significance in the first layer.

28. A method as defined in claim 27, comprising declaring an error in connection with the data packet.

29. A method as defined in claim 26, wherein said ascertaining comprises comparing the layer identifier with an identifier of the first layer.

30. A method as defined in claim 26, comprising pushing a label in the label stack.

31. A method as defined in claim 26, comprising popping a label from the label stack.

* * * * *